United States Patent [19]

Sano et al.

[11] Patent Number: 5,124,193
[45] Date of Patent: Jun. 23, 1992

[54] INJECTION-MOLDED PRODUCT

[75] Inventors: Hironari Sano; Hideaki Nakagawa, both of Yokkaichi; Kenichi Tange; Yoshinori Yamamori, both of Okazaki, all of Japan

[73] Assignees: Mitsubishi Petrochemical Company Limited; Mitsubishi Jidosha Kogyo, both of Tokyo, Japan

[21] Appl. No.: 529,210

[22] Filed: May 25, 1990

[30] Foreign Application Priority Data

May 26, 1989 [JP] Japan ............................ 1-133860

[51] Int. Cl.$^5$ .................... C08J 5/18; B60R 19/03; C08L 23/26; C08L 23/12
[52] U.S. Cl. .................... 428/220; 525/179; 525/211; 525/240; 524/427; 524/445; 524/451; 524/528
[58] Field of Search .................... 525/240; 428/220

[56] References Cited

U.S. PATENT DOCUMENTS

| | | | |
|---|---|---|---|
| 4,634,740 | 1/1987 | Fujita et al. | 525/240 |
| 4,748,206 | 5/1988 | Nogiwa et al. | 525/240 |
| 4,812,526 | 3/1989 | Rifi | 525/240 |

FOREIGN PATENT DOCUMENTS 58-157839  9/1983  Japan.
58-210949  12/1983  Japan.

Primary Examiner—Carman J. Seccuro
Attorney, Agent, or Firm—Koda and Androlia

[57] ABSTRACT

An injection-molded product comprising: component A: 45 to 70% by weight of a propylene polymer 2.16 kg) of 10 to 100 g/10 min and an ethylene content of 0 to 15% by weight; and component B: 30 to 55% by weight of an ethylene/propylene copolymer-based rubber having a melt flow rate (at 230° C. under a load of 5 kg) of 0.5 to 20 g/10 min and a propylene content of 20 to 40% by weight; the ratio $MFR_A/MFR_B$ of the melt flow rate ($MFR_A$) of component A to the melt flow rate ($MFR_B$) of component B being 0.5 to 50, and the molded product having such physical properties as expressed in terms of a modulus in flexure of 2,000 to 5,000 kg/cm$^2$, as determined according to JIS-K7203 and a coefficient of linear expansion of $10 \times 10^{-5}$/° C. or below, as determined according to ASTM-D696, and having an average thickness of 2 to 7 mm.

12 Claims, 2 Drawing Sheets

INJECTION-MOLDED PRODUCT

BACKGROUND OF THE INVENTION

1. Field of the Invention

This invention relates to an injection-molded product which is greatly improved in terms of its appearance (or clear appearance of a coating applied on it) and its low linear expandability, and possesses excellent low-temperature impact resistance and flexibility.

2. Background Art

Automobile parts have now been much more increasingly made of plastics with a view to cutting down fuel costs by weight saving, and so various plastic materials have been used not only for interior parts such as instrumental panels, console boxes, glove compartments, steering wheels and trims and exterior parts such as laces, lamp housings, front grills, mud guards and side bumpers, but also for bumpers, facias and (parts of) bodies heretofore made of metals.

Plastics used for such automobile parts include, for instance, RIM/urethane, composite polypropylene and polymer alloys such as polycarbonate & ABS. In particular, materials used for bumpers and facias are currently broken down into two types, i.e., materials of low rigidity having the property of absorbing impact energy primarily by their deformation and, then, recovering to their original form and the other type of materials of high rigidity which are inferior in deformation recovery properties but are lighter in weight and less expensive.

Of these materials, the former materials are represented by RIM/urethane and polypropylene blended with partially crosslinked ethylene/propylene copolymer rubber (EPR), and generally have a modulus in flexure of about 2,000 to 5,000 kg/cm². The latter materials, represented by polypropylene blended with EPR & inorganic filler, generally have a modulus-in-flexure of about 8,000 to 12,000 kg/cm². These materials are now widely used because of low cost and high productivity upon processing into articles by injection molding.

Specific examples of the low-rigidity type materials are polypropylene compositions comprising partially crosslinked ethylene/propylene copolymer rubber, oil and so on which are prepared by methods as disclosed in Japanese Patent Kokai Publication Nos. 53(1978)-145857, 54(1979)-16554 and 57(1982)-135847, and polypropylene compositions comprising non-crosslinked ethylene/propylene copolymer rubber and high-density polyethylene which are prepared by a method as described in Japanese Patent Kokai Publication No. 56(1981)-106948.

Such low-rigidity type materials are also exemplified by, for instance, polypropylene compositions comprising non-crosslinked ethylene/propylene copolymer rubber and oil, which are prepared by methods as disclosed in Japanese Patent Kokai Publication Nos. 52(1977)-23148, 52(1977)-12650 and 63(1988)-146951.

However, it has been found that the low-rigidity type materials as prepared by the methods disclosed in the above Kokai publications are often lacking in well-balanced quality in view of low-temperature impact resistance and appearance, when injection-molded, and are less than satisfactory when recent car design, esp., the generally uniform flatness of bodies and a coating finish close to sheet metal working are taken in account, because their coefficient of linear expansion is as high as about $15 \times 10^{-5}/°C$. and the clearness of coatings applied on them becomes unsatisfactory. Thus, such low-rigidity materials are prepared by complicated steps including, esp., a crosslinking step so that they are likely to have an ununiform flowability. In consequence, they tend to become unsatisfactory in view of appearance and low-temperature impact resistance, when injection-molded.

The high-rigidity type materials prepared by the above Kokai publications are well-balanced in terms of such properties as low-temperature impact resistance, heat resistance and moldability, but are not satisfactory if the generally uniform flatness of bodies and a coating finish close to sheet metal working are in mind, because like the low-rigidity type materials, they are unsatisfactory in terms of the clearness of coatings applied on them and their coefficient of linear expansion.

In order to prepare materials of low linear expandability, on the other hand, it is a general technique to fill resins with sheet-like or fibrous fillers. As set forth in, for instance, Japanese Patent Kokai Publication Nos. 61(1986)-21145 and 63(1988)-57653, it is known to use glass fibers, talc, whiskers or the like as fillers. In order to obtain materials of sufficiently low linear expandability, however, it is required to add large amounts of fillers. This results in deterioration in flowability and, hence, the appearance (including the clearness of coatings applied on them) and low-temperature impact resistance of molded products.

SUMMARY OF THE INVENTION

As a result of intensive studies made to seek a solution to these problems, the present inventors have found that when a blend of a specific propylene polymer resin and a specific ethylene/propylene copolymer-based rubber at a specific ratio is injection-molded to a specific thickness, then an injection-molded product can be obtained, which is considerably improved in terms of its appearance (the clearness of a coating applied on it) with its low-temperature impact resistance and flexibility being well-balanced, and have thus accomplished the present invention.

Thus, the injection-molded product according to the present invention comprises:

component A: 45 to 70% by weight of a propylene polymer resin having a melt flow rate (at 230° C. under a load of 2.16 kg) of 10 to 100 g/10 min and an ethylene content of 0 to 15% by weight; and component B: 30 to 55% by weight of an ethylene/propylene copolymer-based rubber having a melt flow rate (at 230° C. under a load of 5 kg) of 0.5 to 20 g/10 min and a propylene content of 20 to 40% by weight;

the ratio $MFR_A/MFR_B$ of said melt flow rate ($MFR_A$) of component A to said melt flow rate ($MFR_B$) of component B being 0.5 to 50, and said molded product having such physical properties as expressed in terms of a modulus in flexure of 2,000 to 5,000 kg/cm², as determined according to JIS-K7203 and a coefficient of linear expansion of $10 \times 10^{-5}/°C$. or below, as determined according to ASTM-D696, and having an average thickness of 2 to 7 mm.

The injection-molded product of the present invention has proper flexibility and excellent low-temperature impact resistance and appearance (the clearness of a coating applied on it), and are so improved in its low linear expandability that it excels in dimensional stability. Therefore, it is best-suited for various parts of long length, esp., automobile parts of a large size such as bumpers.

One characteristic feature of the injection-molded product of the present invention is that its coefficient of linear expansion in the direction of injection is as low as $10 \times 10^{-5}/°C$. or below. It is indeed a surprise that when the specific components A and B are combined with each other, such a reduction in the coefficient of linear expansion is achievable—see the comparative examples given later.

BRIEF DESCRIPTION OF THE DRAWINGS

In FIGS. 1 and 2, reference numeral 1 stands for an automobile bumper, 2 a bumper facia, 3 a shock absorber and 4 a bumper lean forcement.

DETAILED DESCRIPTION OF THE INVENTION

I. Components/Composition

Component A

Figure 1:
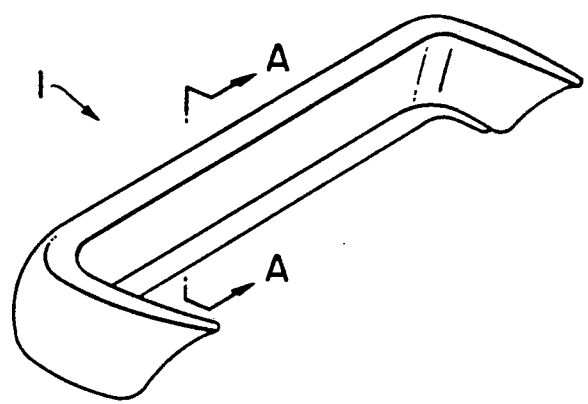
FIG. 1 is a perspective view of an injection-molded automotive bumper prepared in the Examples.

The component A used for the injection-molded product of the present invention is a crystalline propylene polymer resin. More particularly, a propylene polymer resin having an ethylene content of 0 to 15% by weight, preferably 0 to 10% by weight, more preferably 2 to 10% by weight and a melt flow rate (MFR for short and determined at 230° C. under a load of 2.16 kg according to ASTM-D1238, conditions L) of 10 to 100 g/10 min, preferably 20 to 80 g/10 min.

If the ethylene content exceeds the above upper limit, then problems arise in connection with not only injection moldability (releasability) but also attachability. If a resin having an MFR less than the above lower limit is used, then there is a drop of moldability and degradation of the appearance of the obtained moldings, e.g., occurrence of flow marks, whereas if a resin having an MFR higher than the above upper limit is used, then there is a drop of low-temperature impact resistance.

The proportion of the component A to be used is 45 to 70% by weight, preferably 55 to 65% by weight (relative to the total weight of it and the component B). When that proportion is below the above lower limit, the appearance and releasability-upon-molding of the injection moldings will deteriorate, whereas when it exceeds the above upper limit, the coefficient of linear expansion and the low-temperature impact resistance of the moldings will deteriorate.

Component B

The component B used for the injection-molded product of the present invention is an ethylene/propylene copolymer-based rubber. It is here to be noted that the term "ethylene/propylene copolymer-based rubber" refers to copolymers of ethylene and propylene, optionally with other comonomers, esp., non-conjugated dienes.

The non-conjugated dienes include dicyclopentadiene, 1,4-hexadiene, cyclooctadiene, methyl norbornene, 5-ethylene-2-norbornene and so on. Typically, such ethylene/propylene copolymer base rubber is prepared by polymerization using a vanadium base catalyst comprising a vanadium compound such as vanadium chloride or vanadium oxychloride and an organoaluminum compound such as triethyl aluminum sesquichloride. In general, copolymer rubbers prepared with such a catalyst system excels in randomness.

The ethylene/propylene copolymer-based rubber used as the component B in the present invention has a propylene content of 20 to 40% by weight, preferably 22 to 30% by weight and a melt flow rate (at 230° C. under a load of 5 kg according to ASTM-D1238) of 0.5 to 20 g/10 min, preferably 1 to 12 g/10 min.

When a rubber having a propylene content less than the above lower limit is used, the elastic modulus of the resulting injection-molded product becomes too high, whereas when the propylene content exceeds the above upper limit, then the appearance and releasability-upon-molding of the molded product will deteriorate. Further, if the MFR is less than the above lower limit, then not only is the coefficient of linear expansion of the obtained molded product increased, but there is also degradation of moldability (esp., the degradation of the appearance of the molded product, for instance, the occurrence of flow marks). If the MFR exceeds the above upper limit, then there is a drop of low-temperature impact resistance.

The proportion of the component B to be used is 30 to 55% by weight, preferably 35 to 45% by weight (relative to the total weight of it and the component A). If that proportion is below the above lower limit, then not only is the coefficient of linear expansion of the resulting injection-molded product increased, there may also be a drop of low-temperature impact resistance. If that proportion is higher than the above upper limit, on the other hand, then the appearance and releasability-upon-molding of the molded product will deteriorate.

Other Components

The injection-molded product according to the present invention comprises the above components A and B. It is here to be understood that the wording "comprises" means that they may contain, in addition to the above components A and B, auxiliary components (to be described later in greater detail) within the purport of the present invention.

Thus, the injection-molded product of the present invention may contain, in addition to the above components A and B, pigments, stabilizers, antioxidants, UV-absorbers, foaming agents and the like, which are generally incorporated in ordinary resin materials, according to the purposes.

Further, the injection-molded product of the present invention may contain other resins such as ethylene polymers (high-pressure polyethylene: LDPE, low-pressure low-density polyethylene LLPE, low-pressure polyethylene: HDPE, ethylene/vinyl acetate copolymers: EVA, ethylene/acrylate copolymers: EEA, ethylene/acrylic acid copolymers: EAA, and the like), polyamide and polybutene, on condition that the effect of the present invention is not substantially impaired.

If desired, softeners based on mineral oils, which are generally used as softeners for rubbers and called process or extender oils, and further inorganic fillers such as calcium carbonate, carbon black, talc, clay whiskers and glass fibers may be added.

II Injection-Molded Product

(1) Physical Values

The injection-molded product of the present invention is characterized by various physical properties.

In the injection-molded product of the present invention, it is of importance that the ratio of the melt flow rate (at 230° C. under a load of 2.16 kg) of the component A to the melt flow rate (at 230° C. under a load of 5 kg) of the component B, or the melt flow rate ratio of the components A/B, be 0.5 to 50, preferably 1 to 40.

When the melt flow rate ratio is below the above lower limit, then the releasability-upon-molding and appearance of the molded product will deteriorate, whereas when it is higher than the above upper limit, then there may be a drop of the low-temperature impact resistance of the resulting product with possible increase in its coefficient of linear expansion.

When injection moldings containing such components are used in the form of, e.g., exterior automotive trim of a large size, it is important that their modulus in flexure (determined according to JIS-K7203) be within a certain range. In other words, the proportion of the respective components A and B is desirously selected from the above ranges such that the modulus in flexure, which is one of the essential requirements of the present invention, is 2,000 to 5,000 kg/cm$^2$, preferably 2,500 to 4,000 kg/cm$^2$. When a molded product having a modulus in flexure less than 2,000 kg/cm$^2$ is used as exterior automotive trim, it poses a problem in connection with its mounting, because it is too flexible for large-sized parts such as bumpers. At higher than 5,000 kg/cm$^2$, on the other hand, there are deteriorations of such properties as shock absorption properties and deformation recovery properties as well as detrimental effects on bodies.

Another important feature of the injection-molded product of the present invention is that its coefficient of linear expansion, esp., its coefficient of linear expansion in the direction of flow of resin should be $10 \times 10^{-5}$/°C. or lower. At a value higher than the upper limit, the injection-molded product may vary greatly in size at practical temperatures, e.g., at temperatures ranging from $-40°$ C. to 80° C., thus giving rise to inconvenience at the time of assembling.

Still another important feature of the injection-molded product of the present invention is that its average thickness (a thickness of the molded product over 70% or more of its overall area) be in a range of 2 to 7 mm, preferably 2.5 to 5 mm.

At a thickness higher than 7 mm, the coefficient of linear expansion of the molded product will be large. At a thickness less than 2 mm, on the other hand, the attachability and shape retention of a molded product of such a large size as a length of 1.5 m or longer will deteriorate.

(2) Micro-structure

The injection-molded product of the present invention is provided on their surfaces with a skin layer (an orientated layer of rubber) of 300 μm to about 1 mm in thickness, thereby achieving satisfactorily low coefficients of linear expansion.

Although not fully clarified as yet, such a skin layer is considered to be of a lengthwisely elongated matrix/domain structure. Thus, when the mixture of the above components is vigorously inputted into a mold in injection molding, it flows along the wall surface of the mold while cooled thereby, whereby the ethylene/propylene copolymer-based rubber contained in said mixture is assumed to be stretched in the direction of its flow to form the matrix/domain structure.

Why the injection-molded product having such a matrix/domain structure has a reduced coefficient of linear expansion is considered to be that the stretched rubber component of the matrix/domain structure is thermally shrunk and the amount of shrinkage is reduced from the coefficient of thermal expansion of the propylene polymer in the injection-molded product, whereby the coefficient of linear expansion of the whole injection-molded product is reduced. When the thickness of the injection-molded product is too large, however, the effect of reducing thermal expansion coefficient by the skin layer becomes relatively small, resulting in failure of the attainment of the intended low coefficient of linear expansion of the product. Thus above described range of thickness of the molded product is thus necessary.

Injection Molding

Usually, the components A and B (with other components, if required) are blended together within the range of the aforesaid proportions in ordinary kneading machines such as Banbury mixers, tumbler type mixers, Henschel type mixers, kneaders, single-screw extruders or double-screw extruders and, then, injection-molded in conventional manners. The thus obtained injection moldings may be used as exterior automotive parts such as bumpers, facias, fenders, air dams, air spoilers, laces, front grills and mud guards.

EXPERIMENTAL EXAMPLES

The following examples and comparative examples are given for a more illustrative explanation of the present invention.

Given below are testing methods used for the evaluation of various properties in the examples and comparative examples.

Evaluation

(1) Modulus in Flexure

The modulus in flexure of 3 mm injection molded sheets prepared under molding conditions A was measured according to JIS-K7203.

(2) Coefficient of Linear Expansion

The coefficients of linear expansion of 3 mm injection-molded sheets and 3 mm press-molded sheets prepared under molding conditions A were measured according to ASTM-D696.

(3) Low-Temperature Impact Resistance and Recovery after Deformation

Each of injection-molded bumpers, having an average thickness of 4 mm and prepared under molding conditions B, was provided inside with a shock absorber of propylene foamed body (15 times), in compliance with the practical use, and attached to a given jig at its 16 upper and lower points. Thereafter, impact testing was performed at $-30°$ C. according to FMVSS—Part 581.

The results were then estimated with a mark x indicating that the test samples broken and cracked and a mark ◯ indicating that the test samples did not break and crack.

Thirty minutes after impact testing, the shapes of the molded bumpers were also visually observed to estimate their recovery after deformation.

The results were then estimated with a mark ◯ indicating that the test samples struck deformed ¾ inches or less at their fronts and 3/8 inches or less at their corners with respect to their original shapes and a mark x showing that the test samples struck deformed much more.

(4) Appearance of Injection Moldings

Injection-molded bumpers, having an average thickness of 4 mm and prepared under molding conditions B, were visually observed as to whether or not there were flow marks and variations in gloss.

The results were then estimated with marks x and ◯ indicating the presence and absence of flow marks and variations in gloss, respectively.

(5) Injection Moldability

Injection molding was carried out under molding conditions B. The results were then estimated with a mark ◯ showing that the molded products were releasable with no difficulty, and a mark x indicating that the molded products were caught up on the cavity side at the time of mold opening or demolding, or they were not smoothly ejected from the core side with an ejector pin.

(6) Attachability and Deformation after Attachment

Figure 2:
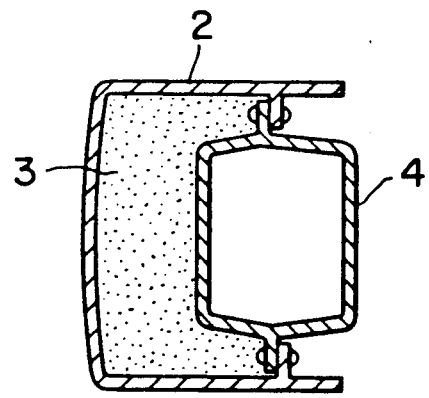
FIG. 2 is a sectional view taken along the line A—A in FIG. 1.
Figure 4:
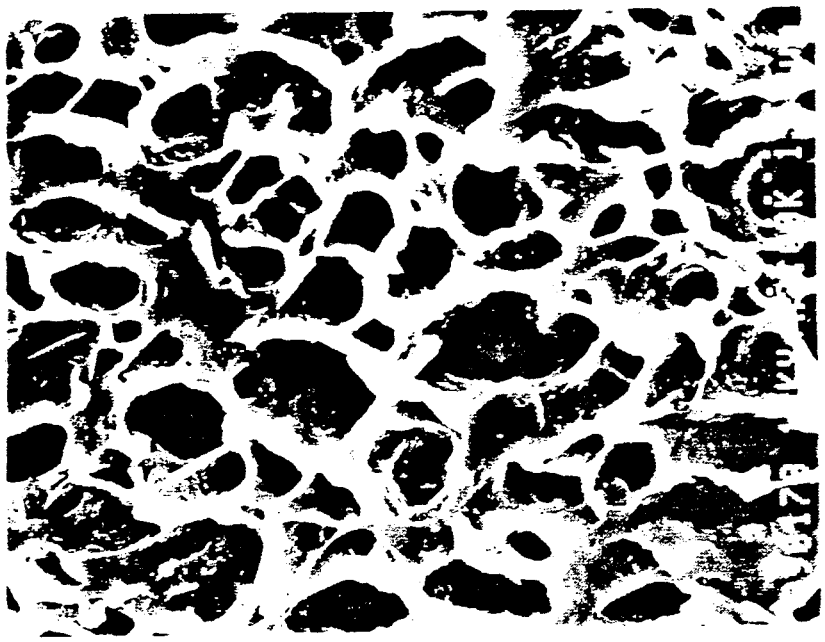
FIG. 4 is a hexane-etching electron micrograph showing the matrix/domain structure of rubber particles in a press-molded sheet produced in Comparative Example 1.
Figure 3:
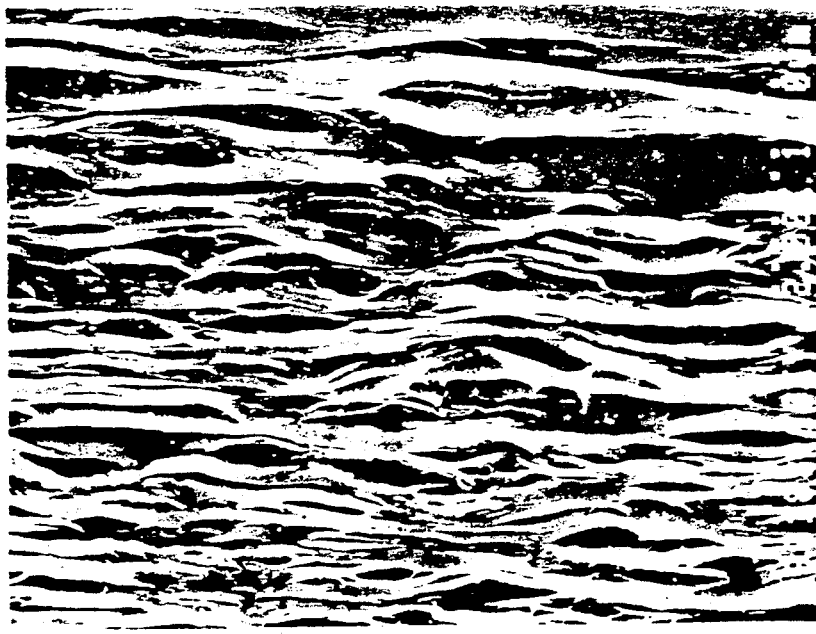
FIG. 3 is a hexane-etching electron micrograph showing the matrix/domain structure of stretched rubber particles in the skin layer of an injection-molded product produced in Example 2.

As shown in FIG. 2, each of injection-molded bumpers, having an average thickness of 4 mm and prepared under shock molding conditions B, was provided inside with a shock absorber of propylene foamed body (15 times), as actually carried out, and was attached to a given jig at a total of 16 points, nine points on its upper surface and seven points on its lower surface.

As in the case with an actual bumper, the thus attached molded bumper was horizontally fixed and the flatness (or undulation) of its upper surface was observed visually. The results were then estimated with a mark x showing that the tested bumpers were noticeably undulated and a mark ◯ indicating that the tested bumpers were not substantially deformed.

Thereafter, the injection-molded bumpers were subjected to temperature resistance testing at a high temperature of 80° C., at a low temperature of −30° C. and at high temperature and humidity of 40° C. and 95% in a testing run d according to the Automotive Standards JASO-M312-85 entitled "Testing Methods of Molded Plastic Parts". The results were again estimated in similar visual manners as mentioned above.

(7) Coating Receptivity (Clearness of Coating)

With a vapor cleaner using the vapor of 1,1,1-trichloroethane, injection-molded bumpers, having an average thickness of 4 mm and prepared under molding conditions B, were allowed to stand in that vapor for 30 seconds and, then, cooled off for 60 seconds. For a further 30 seconds, they were allowed to stand in that vapor.

Then, a halogenated polypropylene primer was coated on each bumper to a thickness of 10 to 15 μm on dry basis, which was in turn allowed to stand at room temperature for 3 to 5 minutes. Next, a two-pack urethane coating was applied on the coated bumper to a thickness of 30 to 35 μm on dry basis, which was in turn permitted to stand at room temperature for 10 to 15 minutes, followed by baking and drying at 100° C. for 20 minutes, thereby preparing a coated sample.

The thus coated samples were set in an image visibility meter made by Suga Shikenki Co., Ltd. to estimate the clearness of the coatings with a mark ◯ indicating 50 points or higher and a mark x indicating less than 50 points.

In this connection, a steel plate applied with a coating (based on melamine alkyd) for automobile bodies scored about 60 points.

EXAMPLES 1-6 & COMPARATIVE EXAMPLES 1-12

Components

The components A and B used in the examples and comparative examples are shown below in Tables 1 and 2.

TABLE 1

| Component A Propylene polymer resins | 230° C., 2.16 kg MFR (g/10 min) | Ethylene content (weight %) | Type of polymer |
|---|---|---|---|
| PP-1 | 30 | 9 | Block |
| PP-2 | 60 | 5 | Block |
| PP-3 | 25 | 0 | Homo |
| PP-4 | 20 | 17 | Block |
| PP-5 | 120 | 5 | Block |
| PP-6 | 3 | 6 | Block |

TABLE 2

| Component B Ethylene/propylene copolymer based rubber | 230° C., 5 kg MFR (g/10 min) | Propylene content (weight %) | Catalyst System |
|---|---|---|---|
| EP-1 | 2 | 25 | Vanadium |
| EP-2 | 9 | 25 | Vanadium |
| EP-3 | 2 | 70 | Titanium |
| EP-4 | 0.1 | 30 | Vanadium |
| EP-5 | 30 | 25 | Vanadium |

Blending

The propylene polymer resins as the component A and the ethylene/propylene copolymer-based rubber as the component B, respectively shown in Tables 1 and 2, were blended with a peroxide "Perhexa 25B"—trade name—made by Nippon Yushi Co., Ltd., divinylbenzene as a crosslinking agent and 13 μm diameter and 200 μm long glass powder "Cut Fiber"—trade name—made by Fuji Fiber Co., Ltd. as a fibrous filler at the proportions indicated in Table 3 with a Henschel type mixer, and the mixtures were then melted at 200° C. and extruded through a double-screw extruder having a diameter of 45 mm to obtain pellets.

Molding

In Comparative Example 1, the pellet was press-molded at 200° C. into a sheet. In Examples 1-6 and Comparative Examples 2-12, injection molding was carried out under the molding conditions A as specified in Table 3 to obtain 120×120×3 mm or 120×120×8 mm molded sheets for estimation.

Another injection molding was carried out under the molding conditions B as specified in Table 3 to obtain a 1,675 mm long, 600 mm wide and 300 mm high molded bumper for automobiles having an average thickness of 4 mm, which is shown in FIG. 1.

The results are shown in Table 4.

TABLE 3

| Injection Molding Conditions | Molding Conditions-A | Molding Conditions-B |
|---|---|---|
| | Molding Machine | |
| | Closing pressure: 140 Ton In-line Screw Type | Closing pressure: 2,500 Ton In-Line Screw Type |
| | Moldings | |
| | Injection-molded Sheet | Automobile Bumper |
| Set Temp. | 220° C. | 220° C. |
| Primary Pressure, Time | 600 kg/cm² · 5 sec | 900 kg/cm² · 18 sec |
| Secondary Pressure, Time | 500 kg/cm² · 10 sec | 700 kg/cm² · 10 sec |
| Cooling Temp. | 30° C. | 25° C. |
| Cooling Time | 20 sec. | 50 sec. |
| Rotating Speed of Screw | 80 r.p.m. | 90 r.p.m. |

TABLE 4

| | | | | Examples | | | | | Comparative Examples | | | |
|---|---|---|---|---|---|---|---|---|---|---|---|---|
| | | | 1 | 2 | 3 | 4 | 5 | 6 | 1 | 2 | 3 | 4 |
| COMPOSITION | | | | | | | | | | | | |
| Component A | | | | | | | | | | | | |
| | MFR(2.16) | C2 | | | | | | | | | | |
| PP-1 | 30 | 9 | 65 | 60 | | | | | 60 | 75 | 40 | 60 |
| 2 | 60 | 5 | | | 60 | 60 | | 50 | | | | |
| 3 | 25 | HOMO | | | | | 55 | | | | | |
| 4 | 20 | 17 | | | | | | | | | | |
| 5 | 120 | 5 | | | | | | | | | | |
| 6 | 3 | 6 | | | | | | | | | | |
| Component B | | | | | | | | | | | | |
| | MFR(5) | C3 | TYPE | | | | | | | | | |
| EP-1 | 2 | 25 | Vanadium | 35 | | 40 | | 45 | 50 | | | |
| 2 | 9 | 25 | Vanadium | | 40 | | 40 | | | 40 | 25 | 60 | 40 |
| 3 | 2 | 70 | Titanium | | | | | | | | | |
| 4 | 0.1 | 30 | Vanadium | | | | | | | | | |
| 5 | 30 | 25 | Vanadium | | | | | | | | | |
| MFR$_A$/MFR$_B$ | | | 15 | 3.3 | 30 | 6.7 | 13 | 30 | 3.3 | 3.3 | 3.3 | 3.3 |
| Cut Fiber 13 μm diameter 200 μm length | | | | | | | | | | | | |
| Peroxide-1 Perhexa 25B | | | | | | | | | | | | |
| Divinylbenzene | | | | | | | | | | | | |
| EVALUATION | | | | | | | | | | | | |
| Sheet Press-molded sheet | | | — | — | — | — | — | — | 3 mm | — | — | — |
| Injection-molded sheet | | | 3 mm | 3 mm | 3 mm | 3 mm | 3 mm | 3 mm | — | 3 mm | 3 mm | 3 mm |
| Physical Properties Modulus in Flexure kg/cm² | | | 4000 | 3500 | 4400 | 4300 | 4000 | 3600 | — | 6300 | 1800 | — |
| Coefficient of Linear Expansion × 10⁻⁵/°C | | | 9.0 | 8.5 | 9.0 | 8.2 | 7.8 | 6.2 | 16.0 | 13.8 | 4.5 | 12.5 |
| Low-temperature Impact Resistance 30° C. | | | ○ | ○ | ○ | ○ | ○ | ○ | — | x | ○ | — |
| Deformation Recovery | | | ○ | ○ | ○ | ○ | ○ | ○ | — | x | ○ | — |
| Appearance | | | ○ | ○ | ○ | ○ | ○ | ○ | — | ○ | x | — |
| Injection Moldability (Releasability) | | | ○ | ○ | ○ | ○ | ○ | ○ | — | ○ | x | — |
| Attachability | | | ○ | ○ | ○ | ○ | ○ | ○ | — | ○ | x | — |
| Deformation after attachment | | | ○ | ○ | ○ | ○ | ○ | ○ | — | x | ○ | — |
| Coating Receptivity (Clearness of Coating) | | | ○ | ○ | ○ | ○ | ○ | ○ | — | ○ | ○ | — |

| | | | Comparative Examples | | | | | | | |
|---|---|---|---|---|---|---|---|---|---|---|
| | | | 5 | 6 | 7 | 8 | 9 | 10 | 11 | 12 |
| COMPOSITION | | | | | | | | | | |
| Component A | | | | | | | | | | |
| | MFR(2.16) | C2 | | | | | | | | |
| PP-1 | 30 | 9 | | | | 60 | 60 | 60 | | 65 |
| 2 | 60 | 5 | | | | | | | 30 | |
| 3 | 25 | HOMO | | | | | | | | |
| 4 | 20 | 17 | 60 | | | | | | | |
| 5 | 120 | 5 | | 60 | | | | | | |
| 6 | 3 | 6 | | | 60 | | | | | |
| Component B | | | | | | | | | | |
| | MFR(5) | C3 | TYPE | | | | | | | |

TABLE 4-continued

| | | | | | | | | | | | |
|---|---|---|---|---|---|---|---|---|---|---|---|
| EP-1 | 2 | 25 | Vanadium | 40 | 40 | | | | | 50 | 35 |
| 2 | 9 | 25 | Vanadium | | | 40 | | | | | |
| 3 | 2 | 70 | Titanium | | | | 40 | | | | |
| 4 | 0.1 | 30 | Vanadium | | | | | 40 | | | |
| 5 | 30 | 25 | Vanadium | | | | | | 40 | | |
| MFR$_A$/MFR$_B$ | | | | 10 | 60 | 0.33 | 15 | 300 | 1 | 30 | 15 |
| Cut Fiber | | | | | | | | | | 20 | |
| 13 μm diameter | | | | | | | | | | | |
| 200 μm length | | | | | | | | | | | |
| Peroxide-1 Perhexa 25B | | | | | | | | | | | 0.05 |
| Divinylbenzene | | | | | | | | | | | 0.1 |
| EVALUATION | | | | | | | | | | | |
| Sheet | | | | — | — | — | — | — | — | — | — |
| Press-molded sheet | | | | | | | | | | | |
| Injection-molded sheet | | | | 3 mm | 3 mm | 3 mm | 3 mm | 3 mm | 3 mm | 3 mm | 3 mm |
| Physical Properties | | | | 1300 | 4500 | 3200 | 2800 | 3400 | 3600 | 4000 | 3500 |
| Modulus in Flexure | | | | | | | | | | | |
| kg/cm$^2$ | | | | | | | | | | | |
| Coefficient of Linear | | | | 8.3 | 11.5 | 4.8 | 15.2 | 13.5 | 5.1 | 4.6 | 14.8 |
| Expansion × 10$^{-5}$/°C. | | | | | | | | | | | |
| Low-temperature Impact | | | | ○ | x | ○ | ○ | x | x | ○ | ○ |
| Resistance 30° C. | | | | | | | | | | | |
| Deformation Recovery | | | | ○ | x | ○ | ○ | x | x | ○ | ○ |
| Appearance | | | | ○ | ○ | x | x | ○ | ○ | ○ | x |
| Injection Moldability | | | | x | ○ | x | ○ | ○ | ○ | ○ | ○ |
| (Releasability) | | | | | | | | | | | |
| Attachability | | | | x | ○ | ○ | ○ | ○ | ○ | ○ | ○ |
| Deformation after | | | | ○ | x | ○ | x | x | ○ | ○ | x |
| attachment | | | | | | | | | | | |
| Coating Receptivity | | | | ○ | ○ | ○ | x | ○ | ○ | x | x |
| (Clearness of Coating) | | | | | | | | | | | |

What is claimed is:

1. An injection-molded product consisting essentially of:
    component A: 55 to 65% by weight of a propylene polymer resin having a melt flow rate (at 230° C. under a load of 2.16 kg) of 10 to 100 g/10 min and an ethylene content of 0 to 15% by weight; and
    component B; 35 to 45% by weight of an ethylene/propylene copolymer-based rubber having a melt flow rate (at 230° C. under a load of 5 kg) of 0.5 to 20 g/10 min and a propylene content of 20 to 40% by weight;
    the ratio MFR$_A$/MFR$_B$ of said melt flow rate (MFR$_A$) of component A to said melt flow rate (MFR$_B$) of component B being 0.5 to 50, and
    said molded product having such physical properties as expressed in terms of a modulus in flexure of 2,000 to 5,000 kg/cm$^2$, as determined according to JIS-K7203 and a coefficient of linear expansion of 10×10$^{-5}$/°C. or below, as determined according to ASTM-D696, and having an average thickness of 2 to 7 mm.

2. The injection-molded product according to claim 1, wherein the component A has a melt flow rate of 20 to 80 g/10 min and an ethylene content of 2 to 10% by weight.

3. The injection-molded product according to claim 1, wherein the ethylene/propylene copolymer-based rubber of component B is a copolymer of ethylene, propylene and a non-conjugated diene.

4. The injection-molded product according to claim 3, wherein the non-conjugated diene is selected from the group consisting of dicyclopentadiene, 1,4-hexadiene, cyclooctadiene, methyl norbornene and 5-ethylidene-2norbornene.

5. The injection-molded product according to claim 1, wherein the component B has a melt flow rate of 1 to 12 g/10 min and a propylene content of 22 to 30% by weight.

6. The injection-molded product according to claim 1 further comprising adjuvants selected from the group consisting of pigments, stabilizers, antioxidants, UV-absorbers and foaming agents.

7. The injection-molded product according to claim 1 further comprising a resin selected from the group consisting of an ethylene polymer, polyamide and polybutene.

8. The injection-molded product according to claim 1 further comprising a process oil or an extender oil.

9. The injection-molded product according to claim 1 further comprising an inorganic filler selected from the group consisting of calcium carbonate, carbon black, talc, clay whiskers and glass fibers.

10. The injection-molded product according to claim 1, wherein the ratio MFR$_A$/MFR$_B$ is 1 to 40.

11. The injection-molded product according to claim 1, wherein said modulus in flexure is 2,500 to 4,000 kg/cm$^2$.

12. The injection-molded product according to claim 1, wherein said average thickness is 2.5 to 5 mm.

* * * * *